United States Patent [19]

Chenoweth et al.

[11] Patent Number: 4,610,323
[45] Date of Patent: Sep. 9, 1986

[54] COMBINATION WEIGHING SYSTEM

[75] Inventors: David A. Chenoweth, San Pablo; Thornton R. Davis, Jr., Albany, both of Calif.

[73] Assignee: The Paxall Group, Inc., Chicago, Ill.

[21] Appl. No.: 759,060

[22] Filed: Jul. 24, 1985

[51] Int. Cl.⁴ .................... G01G 19/22; G01G 23/14
[52] U.S. Cl. ...................................... 177/25; 177/164; 364/567
[58] Field of Search ................. 177/25, 164; 364/567

[56] References Cited

U.S. PATENT DOCUMENTS

| | | | |
|---|---|---|---|
| 4,267,894 | 5/1981 | Hirano et al. | 177/25 |
| 4,418,771 | 12/1983 | Henry et al. | 177/25 X |
| 4,508,186 | 4/1985 | Sashiki et al. | 177/25 X |
| 4,519,042 | 5/1985 | Minamida et al. | 177/25 X |
| 4,549,618 | 10/1985 | Kono | 177/25 |
| 4,553,616 | 11/1985 | Haze | 177/25 X |

Primary Examiner—George H. Miller, Jr.
Attorney, Agent, or Firm—Fitch, Even, Tabin & Flannery

[57] ABSTRACT

The invention relates to a combination weighing system for non-uniform weight items which comprises a plurality of hoppers that selectively empty by means of gates into a chute, and then usually into a packaging machine. The system further comprises check weighers associated with each hopper and a combination selection and machine control logic which typically receives weight signals from the check weighers and sends discharge signals to predetermined gates so as to combine items in order to achieve a nominal weight between a predetermined minimum weight and maximum weight. The improvement comprises a set point determining circuit which includes logic blocks to establish a changeable set point within the range of the maximum and minimum weights. The logic blocks allow weights below a set weight and/or maintenance of an overall average weight for the output of the system. The logic blocks may also permit setting of a percentage by count, or by weight, of weighment discharges below a set weight as well as permitting the setting of intervals between weighment discharges below a set weight. Feedback of selected weights from the combination selection and machine logic may be monitored to determine maintenance of user set parameters.

6 Claims, 7 Drawing Figures

TRADITIONAL WEIGHER HISTOGRAM

TYPICAL COMBINATION WEIGHER WEIGHT HISTOGRAM
TARGET WEIGHT EQUALS LABEL WEIGHT

SIMPLIFIED TIMING DIAGRAM

COMBINATION WEIGHING SYSTEM

The present invention relates generally to combination weighing methods and apparatus, and more particularly, it relates to combination weighing systems which provide adjustable input in the system whereby a controlled dispersion of weights can be obtained.

BACKGROUND OF THE INVENTION

Traditional net weight scales produce a dispersion of weights about a target weight. This dispersion is typically a bell shaped curve, approximating a binomial distribution. Because of the random nature of these scales, government and corporate standards for filling by weight have typically allowed for a nominal number of below-label-weight packages or containers.

In order to comply with package weight standards in the United States, and other countries, the traditional net weight scale is set so that the target weight is the label weight of the package, plus an amount to insure that most, typically 95% or 2-sigma, packages have at least the weight printed on the container. This concept is generally illustrated in the histogram in FIG. 1. Thus, the regulations for package weight accuracy take into account the fact that traditional net weight scales are random in nature and that occasional packages below-label-weight will be produced.

In order to accommodate the packaging of items having varying weights, such as frozen vegetables, combination weighers have been heretofore developed and are being routinely used. These combination weighers operate on a principle that does not produce random weights dispersed like those shown in FIG. 1. Rather, combination weighers employ a number of hoppers associated with check weighers (typically 10 to 20) which are scanned to determine which hoppers, when discharged together, will deliver a total weight equal or closest above a preset target weight. One method of achieving the combination process is described in U.S. Pat. No. 4,267,894. Typically, the target weight of the machine is set to the label weight of the final package to be filled. The weight distribution for a typical combination weigher is depicted generally in the diagram identified as FIG. 2.

Combination weighers comprise, in typical operations, a multiplicity of hoppers, each of which is connected with a check weigher. Each hopper is equipped with an unloading gate and associated with a refilling mechanism. Assuming that all of the hoppers have items in them, the respective check weigher signals are summed according to an algorithm that provides various combinations of signals. The combination or sum of check weigher signals that represents the weight equal to or greater than a minimum weight, but less than or equal to a maximum weight is determined. The hoppers corresponding to the selected combination of check weigher signals are discharged by operating their unloading gates, thereby dropping the items from the selected hoppers into a discharge chute, which typically is interfaced to a packaging machine. When the unloading gates close, the hoppers that were emptied are refilled with items.

A simplified diagram of the signals generally used in a typical combination weigher is shown in FIG. 3, with respect to a typical combination selection and machine control logic. The input signals are from check weighers, designated $S_1 \ldots S_n$, the minimum weight set-point, the maximum weight set point, and the cycle start. The output signals are the unloading gate signals, designated $U_1 \ldots U_n$, the selected weight signals, and the cycle complete signal. A simplified timing diagram, as shown in FIG. 4, indicates the sequence of operations of a combination weigher. It is assumed that the hoppers have items in them ready for weight measurement by the check weighers. The cycle start signal is received at $T_0$. The combination selection and machine control logic then proceeds to find the best combination of check weigher signals within the group $S_1 \ldots S_n$, that is within the minimum weight set-point while not exceeding the maximum weight set-point. When the best combination is found, at time $T_1$, the selected weight output (the combined weight of the selected check weighers) is considered to be valid, whereupon the hoppers corresponding to the selected check weighers are unloaded by giving output signals $U_1 \ldots U_n$, and the cycle complete signal goes to a true setting. During the time from $T_1$ to $T_2$, the empty hoppers are refilled with items. Then, the entire cycle is repeated at time $T_2$ with the next cycle start signal. The timing is typically more complex than described herein in conventional combination weighing operations. Many applications require two or more cycles to be interleaved to obtain more speed. For example, while one set of hoppers is being refilled, the remaining check weighers whose hoppers have items are scanned and selected by the combination selection and machine control logic. U.S. Pat. Nos. 4,385,671, 4,441,567, and 4,470,166 describe one approach to obtain speed in this manner. Regardless of the complexity of the timing to obtain speed, the methods used herein apply and the combination selection and machine control logic is in the prior art.

The method of obtaining the combination of signals from the check weighers for minimum and maximum weight set points is irrelevant. The first implementations of combination weigher systems used a selection process that stopped searching at the first combination of weights within the minimum and maximum setpoints, as for example, see U.S. Pat. Nos. 3,939,928 and 4,336,852. This method, while easy to implement, did not provide the best performance for the end user who is striving for the weight closest to the lower weight set-point. U.S. Pat. Nos. 4,267,894, 4,454,924 and 4,466,500 describe methods to find the best weight which is the recommended approach.

Thus, the prior art combination weigher systems in general, have, at most, two user settable weight parameters, the minimum weight set-point and the maximum weight set-point. However, many applications of combination weighers require several user settable weight zones with a means to preset the frequency of weighments within the zone. Additionally, many users desire a means whereby the combination selection and machine control logic determines the optimum weight set-point automatically so that the average weight of the discharged items does not go below a predetermined weight. Finally, many users want a minimum number of discharges to occur between the selection of various weight zones. Thus, the prior art combination weigher systems do not enable a control of dispersion of package weight. For example, if the target weight of a combination weigher is set below the label weight of the package or container, a disproportionate and uncontrolled number of packages will be below the label weight. When the individual weight of the items of product is high relative to the total weight of the package, the number of below weights becomes unacceptable. The effect of setting target weights below the label weight is, therefore, not successfully practiced with present combination weigher systems.

In addition, the prior art combination weigher systems have not provided the opportunity to specifically control discharge weights; nor have they permitted maintaining average weight from the systems; nor have they provided a control of the percentage of discharges at weights below the target weight; nor provided for the computation of set-points.

In summary, the prior art combination weighers have provided a combination selection and machine control logic which accepted signals from check weighers and permitted the setting of maximum weight set-points and minimum weight set-points, along with output signals for discharging the items in hoppers into a chute for feeding into an interfaced packaging machine. The prior art, of course, has provided for cycle start signals and cycle complete signals. However, these limited combination weighers have left much to be desired for current users.

A principal object of the present invention is the provision of an improved combination weighing system.

Another object of the invention is the provision of improved combination weighing methods and apparatus which can be made to conform to desired criteria set by the user.

A further object of the invention is the provision of an improved combination weighing system which sets inputs to a combination selection and machine control logic so as to compare the performance of the combination weighing system with a desired set of parameters determined by the user.

An additional object of the invention is the provision of an improved combination weighing system that discharges weighments below a set point but, at the same time, controls the number of weighments therebelow.

A still further object of the invention is the provision of an improved combination weighing system whereby the average weight of the discharges into the chute is not less than a set weight.

Still another object of the invention is the provision of an improved combination weighing system which permits the control of discharge weights relative to a set point so as to occur at specified intervals in the operation of the system.

A still further object of the invention is the provision of an improved combination weighing system which permits the automatic determination of a set point which is greater than the minimum acceptance weight set for the system.

Various additional objects and advantages of the invention will become apparent by reference to the following drawings and description.

DRAWINGS

SUMMARY OF THE INVENTION

In general, the present invention contemplates the utilization of conventional apparatus in a novel combination weighing system, the apparatus including a multiplicity of hoppers, each of which is attached to a check weigher. Each hopper is equipped with an unloading gate and a refilling means. The unloading gate communicates with a discharge chute so that when the unloading gates are open, as signaled in the operation of the system of the invention, the items in the hoppers discharge into the chute. The chute, in turn, communicates with a packaging machine for receiving items from the chute. The check weighers, hoppers and chute arrangement, along with the packaging machine, are within the prior art and are readily available in the market place. The check weighers are provided with signal outputs and the unloading gates are adapted to receive selected signals in accordance with normal practices. Accordingly, it is not believed necessary to illustrate the mechanical arrangements which are operated by the system of the invention.

Figure 6:
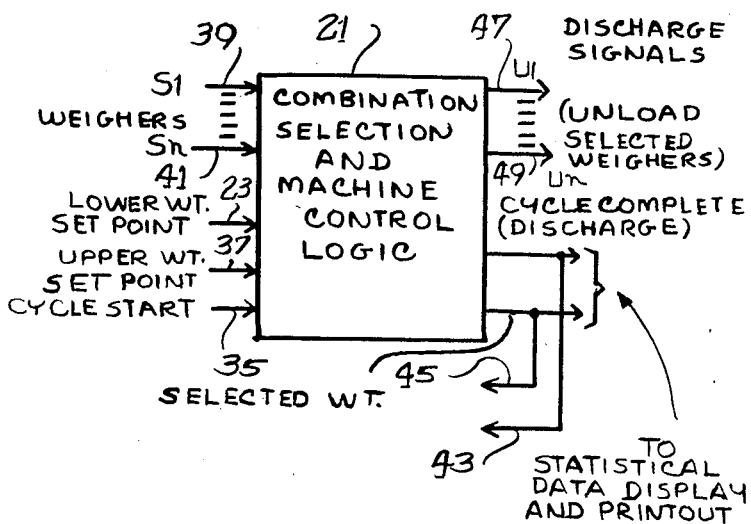
FIG. 6 is a diagram of a combination selection and machine control logic showing the lower weight set-point input from the circuitry shown in FIG. 5, and indicating output which is returned for comparison to the parameters of the input circuit.
Figure 3:
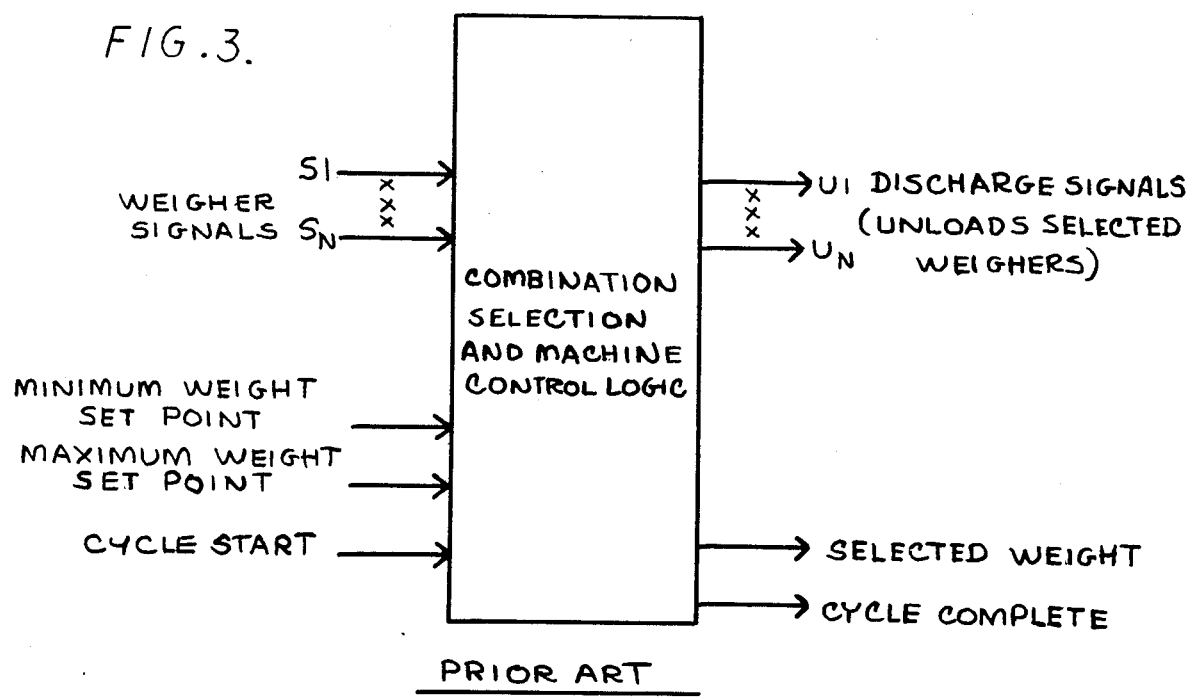
FIG. 3 is a diagram of a combination selection and machine control logic within the prior art.
Figure 4:
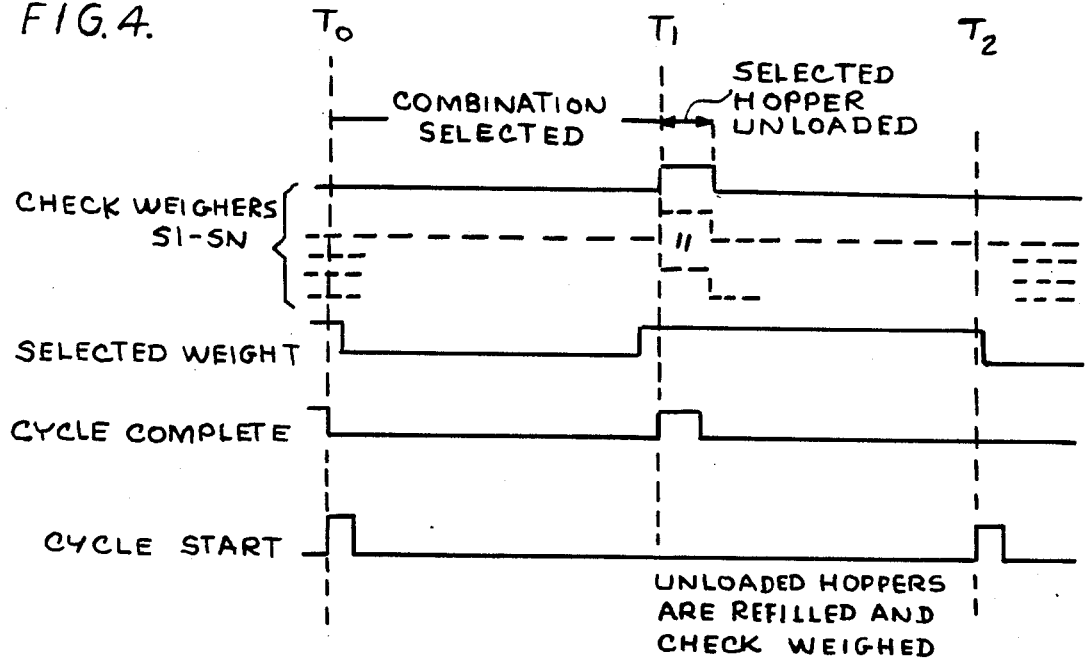
FIG. 4 is a timing diagram for a combination weigher.

The combination weighing system of the invention includes a set-point determining circuit which can be used to determine a change of an input signal (FIG. 5) to the combination selection and machine control logic (FIG. 6). The normal inputs for maximum weight or minimum weight can be considered as upper weight and/or lower weight input signals to the combination selection and machine control logic. Thus, the fixed maximum weight and minimum weight signals typically provided to the combination selection and machine control logic are replaced with an upper weight and/or lower weight input signal, either or both of which will be changeable by the set-point determining circuit of the invention. As shown on FIG. 5, the upper weight set-point is unchanged by the set-point determining circuit. On the other hand, the lower weight set-point is changeable by the set-point determining circuit.

The changeable input signal, in accord with the invention, is responsive to predetermined user parameters such as the maximum weight, minimum weight, percentage by count, or by weight, which are below nominal weight, and the interval between below nominal weight weighments. The set-point determining circuit may also use cycle start, cycle complete and/or selected weight output signals associated with the combination selection and machine control logic. While these user determined parameters are set forth as simple set-points, complex mathematical equations, definitions of curves, or other means of defining a series of comparative information for matching a selected weight signal of the combination selection and machine control logic can be used.

The set-point determining circuit, in its operation, can compare the user set-point parameters against the data on actual performance, e.g. selected weight, to determine changed lower and/or upper weight set-points, as desired. The data on actual performance is a collection of information on the actual performance, and/or other information required to determine if the combination weighing system output, is matching the user set parameters. Thus, a closed-loop feedback system is provided where the user parameters are the goal and the data on actual performance constitutes the feedback. As typical, the combination selection and machine control logic receives input signals from the check weighers for selecting a combination of weights and so as to select hoppers for discharge of a desired combination of weights.

Accordingly, the invention basically comprises providing a changeable input signal at or between a user determined maximum weight and/or minimum weight and a nominal weight by means of a set-point determining circuit. The set-point determining circuit includes computing means which serves to operate upon the user determined parameters to deliver the changeable input signal. The weighments resulting can then be compared with the predetermined parameters and the changeable input signal adjusted, if necessary.

Figure 5:
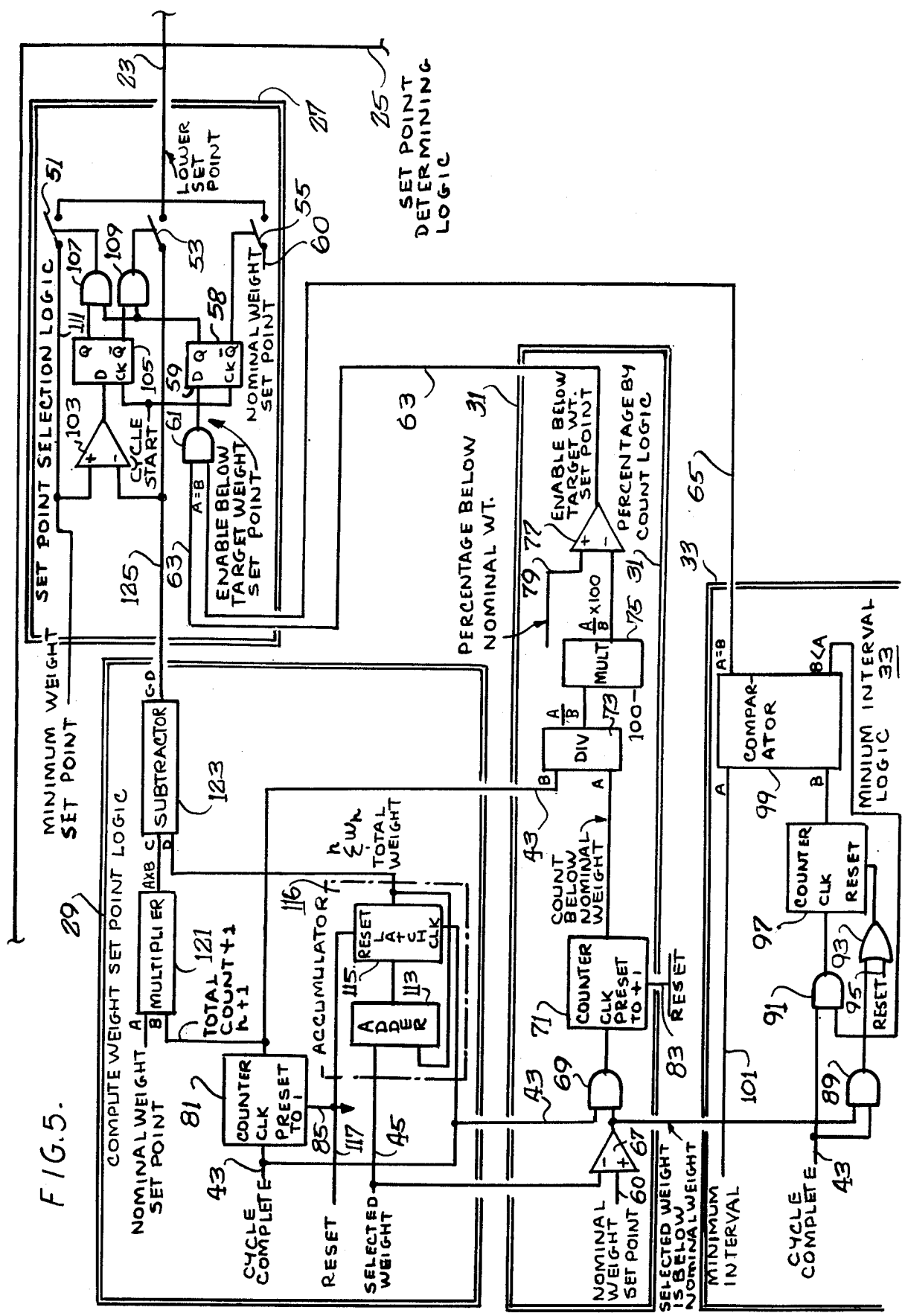
FIG. 5 is a diagram of a particular set-point determining circuit of the invention system for a combination selection and machine control logic.

As shown in FIG. 5, the set-point determining circuit includes a set-point selection logic block and a compute weight set-point logic block. In addition, the set-point determining circuit includes a percentage by count logic block and a minimum interval logic block. However, it will be understood that this is but illustrative of one embodiment of the invention.

The set-point selection logic block provides the direct input to the combination selection and machine control logic. As shown, the set-point selection logic is primarily a switching means which selects between user set parameters and computed signals for providing the changeable input signal to the combination selection and machine control logic. However, the switching means may embrace more complex forms for integrating the user set parameters and computed signals to create the changeable input signal.

The compute weight set-point logic block serves to provide input to the set-point selection logic block as a result of a computation from the selected weight provided from the combination selection and machine control logic and from the user determined nominal weight.

The percentage by count logic block serves to determine the percentage of the total count of items discharged which are to be permitted to discharge below the nominal weight. The embodiment of the invention shown in FIG. 7 effects a like determination based upon weight.

The minimum interval logic serves to establish a minimum interval between times at which below nominal weight items can be discharged from the chute.

Figure 1:
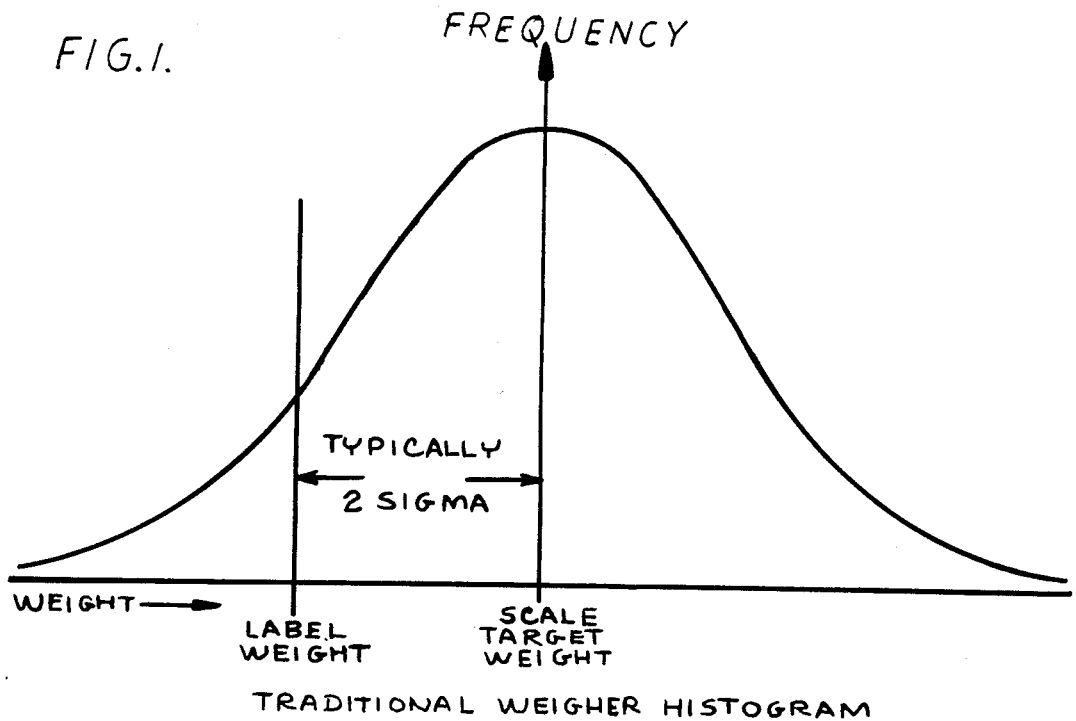
FIG. 1 illustrates a histogram generally indicating the traditional weight dispersion for scales.
Figure 2:
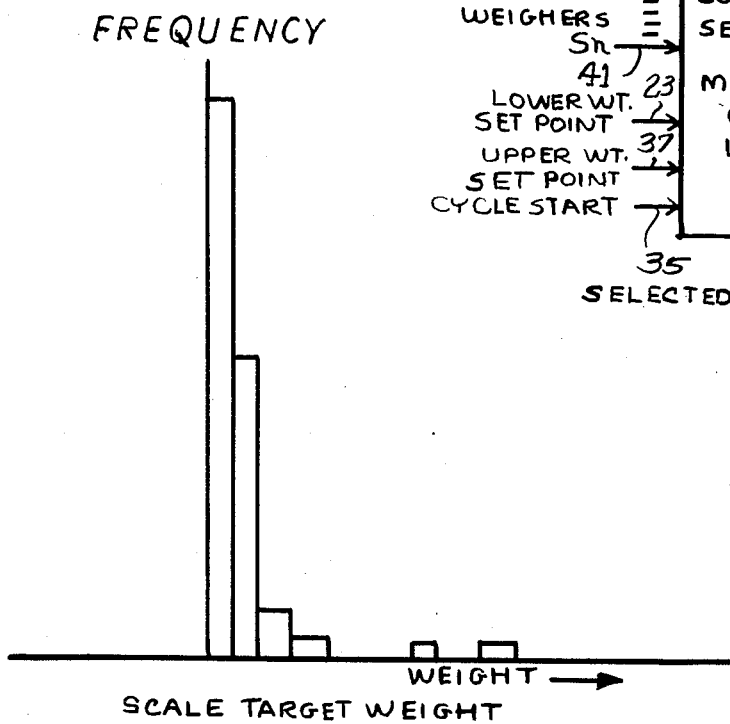
FIG. 2 is a histogram illustrating a typical distribution of weighments in a prior art combination weigher.

Data on actual performance is provided from the combination selection and machine control logic and provides two signals for the set-point determining circuit, one being a signal that goes true upon the discharge of a combined weighment, i.e., time $T_1$ (FIG. 2). This is referred to herein as the cycle complete signal. The second signal output in the illustrated embodiment is a representation, either in analog or digital form, of the weight of the combination that was discharged when the cycle complete was true, and this is referred to as the selected weight. Another signal from the user to the set-point determining circuit is a reset signal which is used to initialize the statistical data gathering circuits. This is typically done when the machine is changed over to run a different product, or at the end of a production run as at the end of a shift or at the end of the day.

The maximum weight set-point, as shown in the drawings, is used unchanged as the upper weight set-point input to the combination selection and machine control logic. On the other hand, the upper weight set-point could be set within the set-point determining circuit.

The value of the lower weight set-point determined by the set-point determining circuit in the illustrated embodiment will always be between the nominal weight set-point and the minimum weight set-point. Typically, the lower weight set-point will be equal to the nominal weight set-point, but is adjusted, in accordance with the invention, by the logic in the set-point determining circuit to control the discharge of below nominal weight items.

The minimum interval logic sets the number of discharges which must occur between nominal target weight discharges. In accord with the invention, the average weight of all chute discharges should not be less than the nominal weight set-point.

That is $$\frac{\sum_{1}^{n} Wn}{n} \geq \text{Nominal Weight}$$

Where
  W is the selected weight,
  n is the number of cycle complete signals or discharges.

In the implementation described here, this control requirement can be restated as, $$\frac{\sum_{1}^{n} Wn + N}{n + 1} = \text{Normal Weight set-point}$$

Where N is the weight that is wanted on the next discharge. Solving for N, N equal nominal weight set-point $$(n + 1) \text{ minus } \sum_{1}^{n} Wn.$$

The value of N will be used to compute the lower weight set-point input to the combination selection and machine control logic. If the selected weight is equal to N, the average weight discharge will equal the nominal weight set-point. If the selected weight is greater than N, then, when all other conditions have been met, a new value of N will be computed which is slightly less than the previous.

The percentage of weighments discharged that are below the nominal weight set-point relative to the total number of discharges must not exceed the percentage below nominal weight settings. The following equation must be satisfied in all cases.

$$\frac{B}{n} \times 100 \leq \text{Percent Below Nominal Weight}$$

Where B is the number of weighments that are below the nominal weight set-point, n is the number of cycle complete signals or discharges.

In the implementation described here this control requirement can be restated as, $$\frac{B+1}{n+1} \times 100 \leq \text{Percent Below Nominal Weight}$$

This equation, if true, indicates that the weight of the next discharge can be below the nominal weight set-point without exceeding the percent below nominal weight limit.

The value computed for the lower weight set-point must never be less than the minimum weight set-point.

SPECIFIC EXAMPLES

EXAMPLE 1

The combination weighing system set forth in this Example is designed to implement four control criteria:

a. The prevention of discharge of a weighment below the nominal weight set-point until a specified number of counts have been achieved.

b. Maintain the average weight of all discharges equal to or greater than the nominal weight set-point.

c. Limit the weighments discharged below the nominal weight set-point relative to the total number of weighments.

d. Maintain the lower weight set-point above the minimum weight set-point.

As shown in the drawings, these criteria are achieved by the circuitry, which is shown in equivalent digital-/analog form and can be readily implemented into a software program within the skill of the art.

The combination selection and machine control logic 21 can be obtained in accord with the prior art and is not further described herein except to indicate the inputs to and outputs from the combination selection and machine control logic. The lower weight set-point, which is provided in accordance with this example, is connected to the combination selection and machine control logic 21 through input line 23 from the set-point determining circuit 25. The set-point determining circuit comprises four primary logic blocks, namely, a set-point selection logic 27; a compute weight set-point logic 29; a percentage by count logic 31; and a minimum interval logic 33. These logic blocks 27, 29, 31 and 33 are all interrelated in providing the lower weight set-point to the input line 23.

For reference, it is noted that the combination selection and machine control logic 21 is provided with a cycle start signal through line 35, and an unchanged upper weight set-point signal through line 37, in addition to the lower weight set-point provided through line 23 from the set-point determining circuit 25. The combination selection and machine control logic 21 also receives signal inputs into the logic from the check weighers, specifically the check weighers associated with the hoppers, represented by lines 39 and 41.

The combination selection and machine control logic 21 also provides output signals indicating the completion of the cycle through line 43 and further provides a signal through line 45 indicating the selected weight which is fed back, as previously indicated, to the set-point determining circuit 25, as will be hereinafter pointed out. As typical, the combination selection and machine control logic 21 provides outputs to the gates for the hoppers in order to release the selected weights and this is accomplished through the lines generally designated 47 and 49. The lower weight set-point is to be distinguished from the minimum weight set-point, as the lower weight set-point is changeable and the minimum weight set-point may not be inputed to the combination selection and machine logic 21.

The set-point determining logic circuit 25, it is believed, can be best described by starting with the outputs and working back to the inputs.

As before indicated, the set-point determining logic circuit 25 determines a value for the lower weight set-point to the combination selection and machine control logic 21. This value is selected through one, and only one, of the three switches 51, 53 and 55 in the set-point selection logic block 27. This circuit further includes a flip-flop 58 having a terminal "D" 59. When this terminal D is false (low), then switch 55 closes so that the user determined nominal weight set-point is provided through line 60 as the lower weight set-point for the combination selection and machine control logic 21. In order for switches 51 and 53 to be selected, the D terminal 59 must be true from AND gate 61. As will be seen, the inputs to the AND gate 61 are enabling signals from the percentage by count logic 31 and the minimum interval logic 33. These inputs to the AND gate 61 are through lines 63 and 65, respectively.

The percentage of weights discharged that are below the nominal weight set-point relative to the total number of discharges should not exceed the user determined percentage below nominal weight setting provided to the percentage by count logic block 31. This determination is made in accordance with the before described equations.

Referring now particularly to the percentage by count logic 31 in the drawings, a comparator 67 is provided which connects to a second AND gate 69 which, in turn, connects to a counter 71. The comparator 67 compares the selected weight output from line 45 with the nominal weight set-point received through line 60 and indicates below nominal weight discharges to the AND gate 69. The AND gate 69 also receives a cycle complete signal through line 43. The counter counts the below nominal weight discharges. The counter 71 provides input to a divider 73, the output of which is inputed into a multiplier 75, which serves to multiply the output of the divider by 100 and provide a percentage. The output of the multiplier 75 provides input to a second comparator 77, which serves to compare with input from the user determined value of percentage below nominal weight through line 79. The divider 73 also receives input from a cycle complete counter 81, which is provided in the compute weight set-point logic block 29.

When the selected weight from the combination selection and machine control logic 21 is less than the nominal weight set-point, the output of the comparator 67 is true, enabling AND gate 69 to pass the cycle complete pulse to the counter 71. The counter, which must be first initialized by a reset signal through line 83, is preset to a value of one and is incremented by one for each weighment which occurs below the nominal weight set-point and discharge from the machine. The total number of discharges is determined by the counter 81, associated with the computed weight set-point logic 29, and this counter is also preset to a value of one by a reset signal through line 85. This counter 81, of course, is incremented by one upon the discharge of each weighment. The contents of the counter 71 is divided by the contents of the counter 81, and the result is multiplied by 100 in the multiplier 75. The output of the multiplier 75 represents the percentage below nominal weight set-point discharges, assuming that the next discharge is, in fact, below the nominal weight set-point. The output of the comparator 77 is true if this value is less than, or equal to, the percentage below nominal weight limit provided by the user through the line 79. The comparator 77 output is an enabling input to the AND gate 61, as indicated above, through line 63.

The other input to the AND gate 61 is from the minimum interval logic block 33 through line 65 and serves to assure that weighments are not discharged below nominal value more than at a determined interval. When the cycle complete signal received from the combination selection and machine control logic 21 is received through line 43, a true signal is provided to the minimum interval logic block 33. This logic block 33, comprises an AND gate 89 and another AND gate 91. An OR gate 93 is provided and connects to a reset signal provided through line 95. The minimum interval logic block 33 further comprises a counter 97, which connects to a comparator 99 for comparing to a user provided minimum interval signal through line 101.

Thus, when the cycle complete signal received through line 43 goes true, AND gate 91 allows the counter 97 to be incremented if the contents of the counter does not exceed the predetermined minimum interval signal. When the contents of the counter 97 is equal to the minimum count interval, the comparator 99 output goes false, inhibiting AND gate 91, thereby preventing any further incrementing of the counter 97. At the time the output of the comparator 99 goes true, it provides an input to AND gate 61 in the set-point selection logic 27. Counter 97 is reset to zero through the OR gate 93 when the reset signal through line 95 goes true or when the selected weight signal received from the combination selection and machine control logic 21 through line 45 is below the nominal weight set-point as provided from the comparator 67.

When both inputs to the AND gate 61 are true, then flip-flop 58 changes state and either switch 51 or 53 will be selected in the set-point selection logic block 27.

The set-point selection logic block 27 also includes a comparator 103 and a second flip-flop 105. The logic block 27 further includes two additional AND gates 107 and 109.

The comparator 103 serves to select, through flip-flop 105 and AND gates 107 and 109, the choice between switches 51 and 53. The comparator 103 and the associated logic serves to assure that there will not be any delivery of product below the minimum weight set-point. If the computed lower weight set-point is less than the user provided minimum weight set-point through line 111, then the output of the comparator 103 will be high, thereby selecting switch 51, which connects the minimum weight set-point through line 111 to the lower weight set-point line 23 for input to the combination selection and machine control logic 21.

The computed weight set-point logic 29 includes an adder 113 and a latch 115, which serve as an accumulator 116 for adding all of the selected weight outputs of the combination selection and machine control logic received through line 45. The latch 115 is cleared to zero when the reset goes true. The reset is provided through line 117. The contents of the counter 81, previously referred to, is incremented by 1 and multiplies the nominal weight set-point by means of a multiplier 121, which connects to a subtractor 123. The output of the subtractor 123 provides a difference signal and is the computed weight set-point which serves to maintain the average weight of all discharges so as not to be less than the nominal weight set-point of the combination weigher system. The difference signal is outputted through line 125 to the set-point selection logic block and becomes the lower weight set-point when switch 53 is closed.

Figure 7:
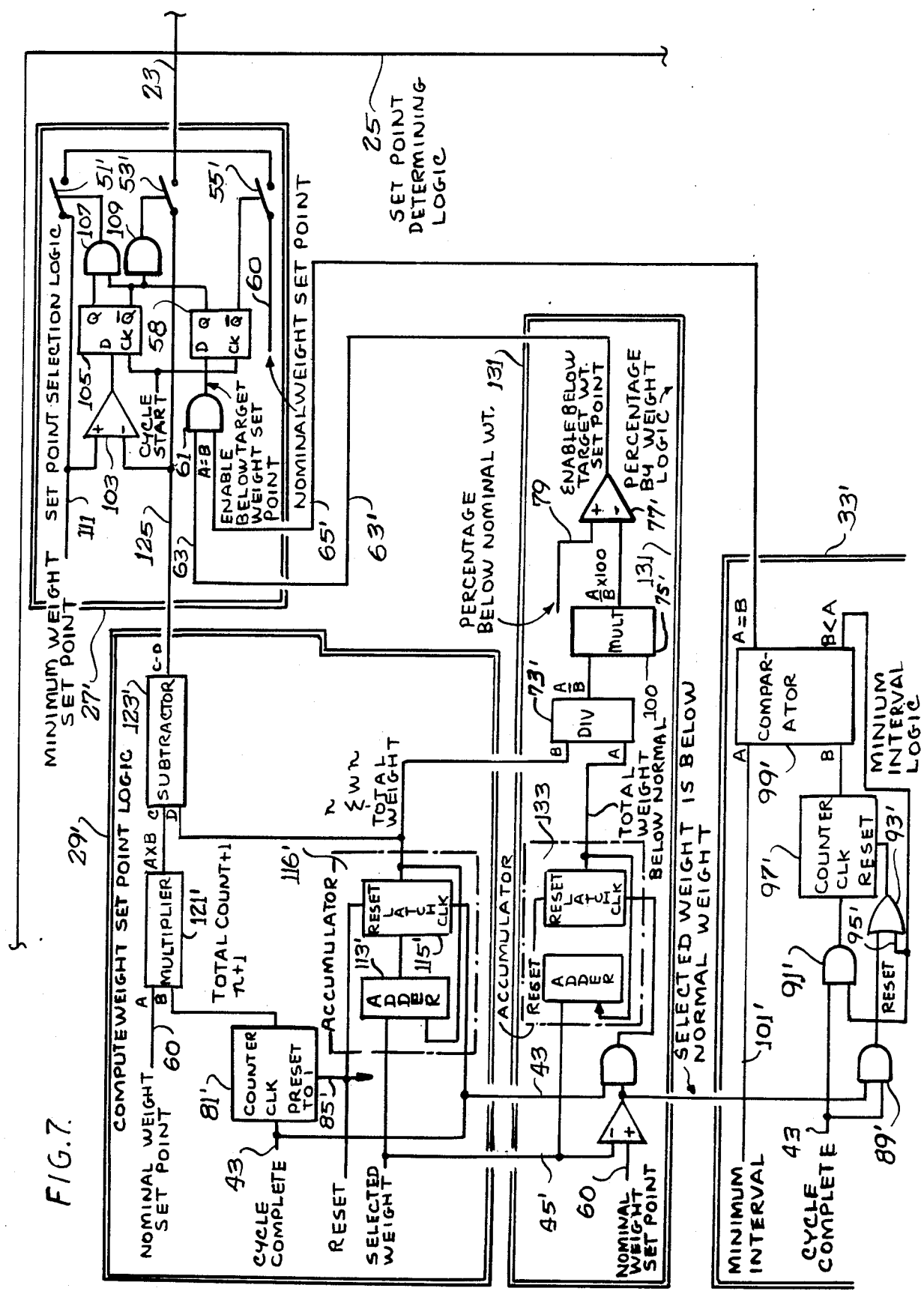
FIG. 7 is a diagram similar to FIG. 5, but illustrates a set-point determining circuit including a logic block which controls percentage of below weight discharges on a weight basis.

The logic for the combination weighing system of the invention can be changed so as to compute the below nominal weight on the basis of weight rather than count as illustrated in FIG. 7 in which like components are similarly numbered but differentiated by the symbol ('). Mathematically, this can be expressed as follows:

$$\frac{\sum_{1}^{i} Li}{\sum_{1}^{n} Wn} \times 100 \leq \text{Percent Below Nominal Weight}$$

Where
$\Sigma Li$ is the sum of all the selected weights below the nominal weight set-point,
$\Sigma Wn$ is the sum of the selected weights.

EXAMPLE 2

Referring now to FIG. 7, which is generally similar to FIG. 5 except that the percentage by count logic block 31 is changed to a percentage by weight logic block 131 and the accumulated weight from accumulator 116' is provided as input to logic block 131. Also, a user provided percentage of weight below nominal weight is provided to the logic block 131.

The percentage by weight logic block 131 includes a comparator 67' which provides a weight signal to AND gate 69' when the selected weight 45' is below the nominal weight signal through line 60. The logic block further includes an accumulator 133 for adding the below nominal weight selected weights and sends its output to the divider 73', which also receives input from the accumulator 116'. The divider 73' and multiplier 75' provide a percentage, on a weight basis of below nominal weight discharges which is fed to comparator 77' which compares to the user provided percentage weight below nominal weight. An enabling signal may be provided to the set-point selection logic 21 through line 63'.

Following the logic that the circuit needs to look ahead to determine if the next discharge should be below the nominal weight set-point, the equation is:

$$\frac{\sum_{1}^{i} Li + N}{\sum_{1}^{n} Wn + N} \times 100 \leq P$$

Where
N is the weight that is wanted on the next discharge.
P is the percent below nominal weight (by weight).
Solving for N:

$$N = \frac{P \sum_{1}^{n} Wn - 100 \sum_{1}^{i} Li}{100 - P}$$

This criteria is be implemented as described above.

The circuits shown herein offer the opportunity of monitoring the check weighing system to determine whether it is meeting the desired parameters. For example, with the above identified example, the weight of the product saved can be easily reported by display, printing or transmittal to a central computer in accord with the following equation:

$$\text{Weight saved} = \sum_{1}^{i} (NWS - SWi)$$

Where

NWS is a nominal weight set-point SWi is the selected weight discharges that are below the nominal weight set-point.

The various features of the invention which are believed to be new are set forth in the following claims:

What is claimed is:

1. In a combination weighing system which comprises a plurality of hoppers each having a discharge gate and an associated check weigher, a chute communicating with said hoppers, and a combination selection and machine control logic for receiving weight signals from the check weighers and for sending discharge signals to selected discharge gates, the combination selection and machine control logic being adapted to receive upper weight and lower weight input signals and also adapted to provide a cycle complete output signal, the improvement which comprises providing a maximum weight signal and a minimum weight signal, and a changeable input signal between the maximum and minimum weights, said changeable input signal being determined by a set-point determining circuit which receives said maximum weight signal or said minimum weight signal and a nominal weight signal, and which includes computing means for providing said changeable input signal to the combination selection and machine control logic between said maximum or minimum weight signal and said nominal weight signal.

2. A combination weighing system in accordance with claim 1 wherein the combination selection and machine control logic also provides a selected weight signal and said set-point determining circuit includes a compute weight logic block which receives the nominal weight signal, selected weight signal and cycle complete inputs from the combination selection and machine control logic, said compute weight logic block including a counter for said cycle complete signals, a multiplier for multiplying the number of cycle complete signals received from said counter times nominal weight, an accumulator for selected weights, and a subtractor for minusing the output of said accumulator from said multiplier and providing a difference signal.

3. A combination weighing system in accordance with claim 2 wherein said set-point selection logic receives the minimum weight signal and said difference weight signal, the set-point selection logic including a comparator which receives the minimum weight signal and said difference weight signal and which connects to means to selectively provide said changeable input signal at or above said minimum weight signal and at or below the nominal weight signal.

4. A combination weighing system in accordance with claim 3 wherein said set-point determining circuit further includes a percentage by count logic which receives the nominal weight signal, selected weight signal, cycle complete signal and an allowable percentage below-nominal-weight signal, said percentage by count logic including a comparator for receiving the nominal weight signal and selected weight signal, and providing a below weight signal when the selected weight is below the nominal weight, a second counter for counting said below weight signals, a divider for receiving said below weight signals from said second counter and also for receiving the cycle count from said first counter in the compute weight logic to provide a dividend, a multiplier to convert said dividend to percentage, and a second comparator for receiving said percentage and allowable percentage below-nominal-weight, said percentage by count logic thereby providing an enabling signal to permit delivery of below nominal weight weighments, said set-point selection logic further including a switching means to selectively provide said changeable input signal and connected to said difference weight signal or to said minimum weight signal.

5. A combination weighing system in accordance with claim 4 wherein said set-point determining circuit additionally includes a minimum interval logic which receives the cycle complete signal, said difference signal, and a minimum interval signal, said minimum interval logic having a resettable counter for counting from the last below nominal weight discharge weighment and a comparator for receiving said minimum interval signal and the count from said resettable counter to provide an enabling signal to said switching means when the minimum interval signal equals the output of said resettable counter or to provide a reset signal to said resettable counter.

6. A combination weighing system in accordance with claim 3 wherein said set-point determining circuit further includes a percentage by weight logic which receives the nominal weight signal, selected weight signal, cycle complete signal and an allowable percentage below weight signal, said percentage by weight logic including a comparator for receiving the nominal weight signal and selected weight signal and providing a said selected weight signal when below nominal weight, a second accumulator for said below weight selected weights signals, a divider for receiving said signals from said accumulators to provide a dividend of weight which is below weight, a multiplier to convert said dividend to percentage, and a second comparator for receiving said percentage of weight which is below weight and the allowable percentage below weight signal, said percentage by weight logic thereby providing an enabling signal to permit delivery of below nominal weight weighments, said set-point selection logic further including a switching means to selectively provide said changeable input signal and connected to said difference weight signal or to said maximum weight signal.

* * * * *